(12) United States Patent
Gupta et al.

(10) Patent No.: US 10,861,022 B2
(45) Date of Patent: Dec. 8, 2020

(54) COMPUTER SYSTEMS AND METHODS TO DISCOVER QUESTIONS AND ANSWERS FROM CONVERSATIONS

(71) Applicant: FMR LLC, Boston, MA (US)

(72) Inventors: Manish Gupta, Bhopal (IN); Vijay Goel, Bengaluru (IN); Aravind Chandramouli, Bengaluru (IN); Rajib Biswas, Bongaon (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/363,889

(22) Filed: Mar. 25, 2019

(65) Prior Publication Data
US 2020/0311738 A1    Oct. 1, 2020

(51) Int. Cl.
| | | |
|---|---|---|
| *G06F 16/00* | (2019.01) | |
| *G06Q 30/00* | (2012.01) | |
| *G06F 16/28* | (2019.01) | |
| *G06F 16/22* | (2019.01) | |
| *G06F 16/2457* | (2019.01) | |
| *G06F 16/9535* | (2019.01) | |
| *G06F 40/166* | (2020.01) | |
| *G06F 40/284* | (2020.01) | |

(52) U.S. Cl.
CPC ........... *G06Q 30/016* (2013.01); *G06F 16/22* (2019.01); *G06F 16/24578* (2019.01); *G06F 16/285* (2019.01); *G06F 16/9535* (2019.01); *G06F 40/166* (2020.01); *G06F 40/284* (2020.01)

(58) Field of Classification Search
CPC .............................. G06Q 30/016; G06F 16/22
See application file for complete search history.

(56) References Cited

U.S. PATENT DOCUMENTS

| | | |
|---|---|---|
| 7,606,714 B2 | 10/2009 | Williams et al. |
| 9,064,001 B2 | 6/2015 | Liu et al. |
| 2008/0040339 A1 | 2/2008 | Zhou et al. |
| 2009/0089044 A1 | 4/2009 | Cooper et al. |
| 2013/0304730 A1 | 11/2013 | Zhou |
| 2015/0261849 A1 | 9/2015 | Chu-Carroll et al. |

(Continued)

FOREIGN PATENT DOCUMENTS

CA          2715777 A1    3/2012

*Primary Examiner* — Grace Park
(74) *Attorney, Agent, or Firm* — Proskauer Rose LLP

(57) ABSTRACT

A computerized method of populating one or more structured databases includes performing, by a computing device, the steps of: receiving customer message data from one or more data sources; extracting, from the customer message data, data sets representative of a set of customer questions; pre-processing, the data sets representative of the set of customer questions using one or more filters, thereby producing pre-processed data sets representative of customer questions; extracting, from the pre-processed data sets representative of customer questions, a set of customer expression data sets; grouping, the customer expression data sets into a set of clusters, each cluster representing one customer intent data set, each customer intent data set corresponding to one or more customer expression data sets; and storing, the customer intent data sets and the customer expression data sets in the structured database(s), the structured database(s) in electronic communication with the computing device.

20 Claims, 10 Drawing Sheets

(56) References Cited

U.S. PATENT DOCUMENTS

| | | | |
|---|---|---|---|
| 2016/0062980 A1* | 3/2016 | Boguraev | G06N 5/04 |
| | | | 706/11 |
| 2016/0196561 A1* | 7/2016 | Iyer | G06Q 10/10 |
| | | | 705/304 |
| 2018/0075016 A1* | 3/2018 | Bennett | G06F 17/2775 |
| 2018/0329882 A1* | 11/2018 | Bennett | G06F 40/30 |
| 2018/0366106 A1* | 12/2018 | Cai | G06F 16/353 |
| 2019/0325029 A1* | 10/2019 | Gandhi | G06F 17/277 |
| 2020/0167417 A1* | 5/2020 | Li | G06F 16/367 |

* cited by examiner

310

CLIENT : ok. Please
AGENT : great. here you are: ###-###-####. they are available until midnight on weekdays.
CLIENT : also another question.
AGENT : please go right ahead.
CLIENT : [how to open a roth ira account on line?]$_1$ [any fee?]$_2$
CLIENT : [if i already have an account roth ira in other place may i still open one with fidelity?]$_3$
AGENT : [that's something i can definitely help you with. we appreciate you considering opening a new account with us.]$_4$
AGENT : [yes you are certainly allowed to open a new roth ira even if you have one elsewhere.]$_3$ [fidelity does not have any maintenance fees for such an account.]$_2$
AGENT : [i'll give you a series of steps to help you easily navigate the web site to open a new roth ira.]$_1$
CLIENT : [any minimum to open?]$_5$
AGENT : [no there is no minimum initial deposit requirement nor any minimum account balance.]$_5$
AGENT : [here are the steps you can use to open a new roth ira online:]$_1$
AGENT : [#. click the open an account link on fidelity.com #. select open online next to roth ira you can also view this web page by accessing the link below: open-account overview]$_1$
CLIENT : [the maximum can not exceed the yearly limit?]$_6$
AGENT : [that's correct. the irs imposes an annual limit of $# ### for contributions to any iras for investors under age ##.]$_6$
CLIENT : great thanks for your help.

FIG. 3B

COMPUTER SYSTEMS AND METHODS TO DISCOVER QUESTIONS AND ANSWERS FROM CONVERSATIONS

TECHNICAL FIELD

This application relates generally to systems, methods and apparatuses, including computer programs, for building knowledge repositories of customer interactions. More specifically, this application relates to automatically discovering customer questions, intents and answers from customer interaction records.

BACKGROUND

Large organizations need to listen to their customers continuously and align their digital assets—such as their website, knowledge repository and virtual assistants—with the information and knowledge that their customers seek. Today, high-capacity, low-cost database and storage solutions have enabled large organizations to retain significant amounts of customer interaction data, such as the queries customers make during customer service sessions, the websites within the organization that customers visit, and the channels through which customers seek assistance. While the sheer volume of stored customer interaction data may hold tremendous value to an organization, it can be prohibitively difficult to extract the full value of these data by human review alone.

Analyzing and discovering customer queries and corresponding answers from unstructured customer interaction data can aid in one or more of the following objectives: development of a virtual assistant for customer service; development of a knowledge repository for customer representatives; design and development of content for a website and/or mobile application for a large firm; understanding of key customer pain points and process improvements; designing marketing campaigns based on customer needs and product use cases; and/or training new customer representatives. However, current solutions have delivered limited ability to automate analytically intensive tasks, leaving human beings to perform those tasks in a time-inefficient manner and ultimately leaving the full potential of increasingly massive customer information data stores unlocked.

Unlike existing solutions, this method of discovering queries from free form chat conversation does not require any prior knowledge of taxonomy and fixed set of query category classes. A significant challenge for curating answers for a large number of queries is that it requires a large amount of skilled manpower, which is expensive and not scalable to the same extent as machine operations. The present approach of mining answers of a given query solves this problem through the use of computing devices without a need for human intervention. Automatic retrieval of appropriate answers from chat conversation is made difficult at least because: (a) of presence of conversational noises; (b) a single answer may spread across multiple window of message events, and identifying the right boundary is necessary (and an important contribution of this invention); (c) a chat conversation between two entities may contain several topics and context intermingled with each other; identifying and isolating the intended answer is an important contribution of the present invention.

SUMMARY

Accordingly, the invention provides systems, methods and apparatuses to build a structured knowledge repository, for example, in the form of one or more databases storing question "intents" (e.g., core inquiries corresponding to one or more "expressions" of the intent) and answer pairs. The invention enables both (i) automatic discovery at scale of customer questions, including intents and/or various expressions of those intents; and (ii) automatic discovery of appropriate responses or answers to the discovered intents. The invention can mine unstructured customer interaction data from a variety of sources available within the organization, such as customer chat logs, phone transcripts and web search queries. The invention can be used for diverse applications, such as in dialog systems, knowledge mining, customer service, customer experience enhancement, knowledge representation, training of customer representatives, sales and marketing, and product design, as well as in a variety of industries such as e-commerce, banking, finance, and telecommunications.

In some embodiments, the invention utilizes separate Intent Discovery and Answer Discovery computing modules. In the Intent Discovery module, the invention reconceives traditional methods of identifying customer questions and determining customer intent. By way of comparison, traditional approaches typically take a top-down approach by listing possible queries manually in a database. This method can be ineffective at covering the highest possible number of questions and expressions encountered within large organizations. In contrast, the invention can group expressions into intent clusters using a novel clustering algorithm. Using this approach, the invention can take historical customer interaction data (e.g., across all channels where customers interact with the organization, including but not limited to customer phone call transcripts, chat logs and web search queries) to discover all possible customer questions and various ways in which same question can be asked.

In some embodiments, it is either impossible or highly impractical for humans to complete the computationally intensive tasks executed by one or more algorithms of the invention. First, discovery of questions involves parsing a high number (e.g., millions) of customer records and in the process "learning" what constitutes a question. There is not always a clear definition of "question" when labeling is done manually. The current invention can operate in an unsupervised manner, e.g., in the absence of any ground truth upon which to discover questions and expressions. Second, discovery of expressions includes making parallel comparisons across millions of records to group the similar expressions together. Third, different sets of customers use different set of words to represent similar meanings (e.g., through synonyms, acronyms, or incorrect spellings), and this problem is exacerbated as language is not static and evolves continuously. It is humanly impossible to find common patterns and group together different expressions of similar questions from millions of records. The present invention can learn from data provided to it and find alternative representations of words (e.g., "thanks," "thank you," "thx" and "ty" all mean the same thing). Fourth, since the same core question can be asked using different linguistic expressions, it is humanly impossible to compare the extracted "intent" across millions of chat sessions. Fifth, customer interaction data (including conversations) are often protected by various privacy laws and other restrictions and cannot be shared with employees tasked with building a knowledge repository.

In some embodiments, the invention has an Intent Discovery computing module that includes novel ways of filtering and pre-processing text, such as identifying spelling mistakes and filtering extraneous conversational text. These mechanisms can allow normalization of text before making similarity calculations for clustering. The invention also has the ability to handle more than one form of unstructured data, which is not the case with traditional approaches (typically, existing methods either have fixed sets of standard questions and/or available answer mapping).

In some embodiments, the invention has an Answer Discovery computing module and can leverage customer conversational data (e.g., historical chat logs between customers and company representatives) and extract the answers to known questions (or question "intents"). The algorithms can make use of novel methods to find patterns in answers of a given question across different customer conversations in which such a question (or its variant expressions) has historically been asked. In some embodiments, the invention provides novel methods to separate conversational noise found in chat from the core answer. In some embodiments (e.g., involving Virtual Assistants), the invention has novel methods to make answers more conversational and cleanly presentable users. This can involve, for example, modifying the answer to match the style and tone of question. In some embodiments, the invention includes novel methods to pick the best answer among several available answers across various chat conversations (in contrast with existing methods, which have fixed sets of questions and/or answers for which mapping is found).

As above, it is difficult or impossible to perform answer discovery manually, because effective methods, such as those presented here, analyze very high numbers of conversational chat session logs together and make parallel comparisons to extract relevant patterns and ultimately core answers. This approach of analyzing full data sets together and making parallel comparisons is impossible (or extremely impractical) for a human to conduct. The same question is often seen to be asked across different conversations that are separated in time. The invention can rank answers algorithmically with speed and efficiency and scope far surpassing that of human beings. In addition, there is no objective definition of what constitutes a good answer when ranked manually. At times, an answer changes with the context of the conversation. It is humanly impossible to find the most relevant answer manually while looking at various conversations together.

In one aspect, the invention features a computerized method of populating one or more structured databases having a set of customer intent data sets and a set of customer expression data sets corresponding to the set of customer intent data sets. The computerized method includes receiving, by a computing device, customer message data from one or more data sources. The computerized method includes extracting, by the computing device, from the customer message data, data sets representative of a set of customer questions. The computerized method includes pre-processing, by the computing device, the data sets representative of the set of customer questions using one or more filters, thereby producing pre-processed data sets representative of customer questions. The computerized method includes extracting, by the computing device, from the pre-processed data sets representative of customer questions, a set of customer expression data sets. The computerized method includes grouping, by the computing device, the customer expression data sets into a set of clusters, each cluster representing one customer intent data set, each customer intent data set corresponding to one or more customer expression data sets. The computerized method includes storing, by the computing device, the customer intent data sets and the customer expression data sets in the one or more structured databases. The one or more structured databases are in electronic communication with the computing device.

In some embodiments, the customer message data is customer question data. In some embodiments, each customer intent data set corresponds to multiple customer expression data sets. In some embodiments, the one or more data sources include at least one of customer chat records, phone call transcripts, or search queries. In some embodiments, the structured database(s) includes business-related tags corresponding to the customer intent data sets. In some embodiments, pre-processing includes filtering for at least one of (i) specific textual words or phrases or (ii) an amount of text above or below a length threshold. In some embodiments, pre-processing includes spell checking and error correcting before clustering. In some embodiments, spell checking and error correcting include using at least one of an acronym expansion tool, a suggested spelling tool, an equivalent word replacement tool, or a stop phrase removal tool. In some embodiments, spell checking and error correcting include identifying one or more misspelled words and correcting the one or more misspelled words using a spell corrector module trained based on an analysis of historical message logs.

In some embodiments, pre-processing includes tokenizing the data sets representative of the set of customer questions into individual sentences and selecting any individual sentences that are questions. In some embodiments, pre-processing includes applying a noise filter to the data sets representative of the set of customer questions. In some embodiments, the computerized method includes partitioning the customer intent data sets by at least one product type, business unit, or company-specific need. In some embodiments, the computerized method includes determining an answer to each customer intent data set based on a pattern determined by analyzing the one or more data sources. In some embodiments, the computerized method includes modifying a style or tone of at least one of the answers to enhance presentation of the answer for a customer.

In some embodiments, determining an answer includes rank ordering two or more possible answers and selecting a best answer among the possible answers. In some embodiments, the computerized method includes presenting the answer to a customer in a virtual assistant module. In some embodiments, the computerized method includes presenting the answer in a frequently asked questions module. In some embodiments, the computerized method includes presenting one or more answers in real time in response to a search query on webpage. In some embodiments, the computerized method includes presenting one or more answers in a customer representative training exercise.

In another aspect, the invention features a computerized method of building one or more structured databases having a set of answer data sets corresponding to a set of customer intent data sets. The computerized method includes identifying, by a user, using a computing device, a customer intent data set for which an answer data set is sought. The computerized method includes identifying, by the computing device, within a database in electronic communication with the computing device, one or more data locations at which a customer has previously asked a question corresponding to the customer intent data set. The computerized method includes generating, by the computing device, a candidate answer set based on one or more previous responses to the question corresponding to the customer intent data set, the candidate answer set having one or more possible answers. The computerized method includes detecting, by the computing device, for each of the possible answers, one or more features of the possible answer. The computerized method includes determining, by the computing device, for each of the possible answers, based on the one or more features of the possible answer, a noise probability estimation of the previous responses using a noise probability estimation algorithm. The computerized method includes determining, by the computing device, for each of the possible answers, one or more core answer features based on the noise probability estimation of the prior responses. The computerized method includes extracting, by the computing device, for each of the possible answers, a core answer candidate based on the one or more core answer features using a core answer extractor algorithm. The computerized method includes ranking, by the computing device, the core answer candidates using an answer ranking algorithm, thereby determining a best answer candidate. The computerized method includes generating, by the computing device, a normalized answer based on the best answer candidate. The computerized method includes repeating the above for additional customer intent data sets for which answers are sought.

In some embodiments, generating a normalized answer includes modifying a style or tone of at least one of the answers to enhance presentation of the answer for a customer. In some embodiments, identifying the one or more data locations includes using a semantic or syntactic similarity between the customer intent data set and unstructured reference data sources containing the customer intent data set. In some embodiments, the one or more data sources include at least one of customer chat records or phone call transcripts. In some embodiments, the noise probability estimation algorithm includes at least one of identifying a domain-specific stop word, breaking sentences in the candidate answer set into tokens and using an inverse document frequency of tokens to calculate a probability of a token within the data set being noise, or representing sentences in the candidate answer set in a vector space according to data set themes.

In some embodiments, detecting core answer features includes (i) detecting a boundary of an answer using one or more acknowledgement signals, and (ii) extracting a core answer using a core answer extraction algorithm. In some embodiments, ranking the core answer candidates is based on a weighted average of a similarity score with other answers ($S_{sim}$) and session level features ($S_{session}$) generated based on historical unstructured customer data. In some embodiments, generating the normalized answer includes making the normalized answer more customer-presentable by correcting grammatical errors and adding a conversant beginning to the answer.

In another aspect, the invention features a computing system for populating one or more structured databases having a set of customer intent data sets, a set of expression data sets corresponding to the set of customer intent data sets, and a set of answer data sets corresponding to a set of customer intent data sets. The computing system includes a database including one or more data sources having customer message data. The computing system includes a computing device in electronic communication with the database, the computing device configured to automatically discover customer intent data sets, expression data sets for the customer intent data sets, and answer data sets corresponding to the customer intent data sets. The computing system includes a server in electronic communication with the computing device. The server is configured to interface with one or more customer devices. The computing device is configured to receive customer message data from one or more data sources. The computing device is configured to extract, from the customer message data, data sets representative of a set of customer questions. The computing device is configured to pre-process the data sets representative of customer questions using one or more filters, thereby producing pre-processed data sets representative of customer questions. The computing device is configured to extract, from the pre-processed data sets representative of customer questions, a set of customer expression data sets. The computing device is configured to group the customer expression data sets into a set of clusters, each cluster representing one customer intent data set, each customer intent data set corresponding to one or more customer expression data sets. The computing device is configured to store the customer intent data sets and the customer expression data sets in the one or more structured databases, the one or more structured databases in electronic communication with the computing device.

The invention can help bring scale and efficiency in customer service and experience, for example by way of following applications: (1) Virtual Assistants for Customers; (2) Virtual Assistant for Customer Representatives; (3) Designing FAQ's based on what customers are asking; (4) answering search queries on webpage in real time; (5) Question-Answer pairs can be used as training resources for on-boarding customer representatives.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 3B shows an annotated transcript between a client (or customer) and an agent (or customer representative), according to an illustrative embodiment of the invention.

DETAILED DESCRIPTION

Figure 1:
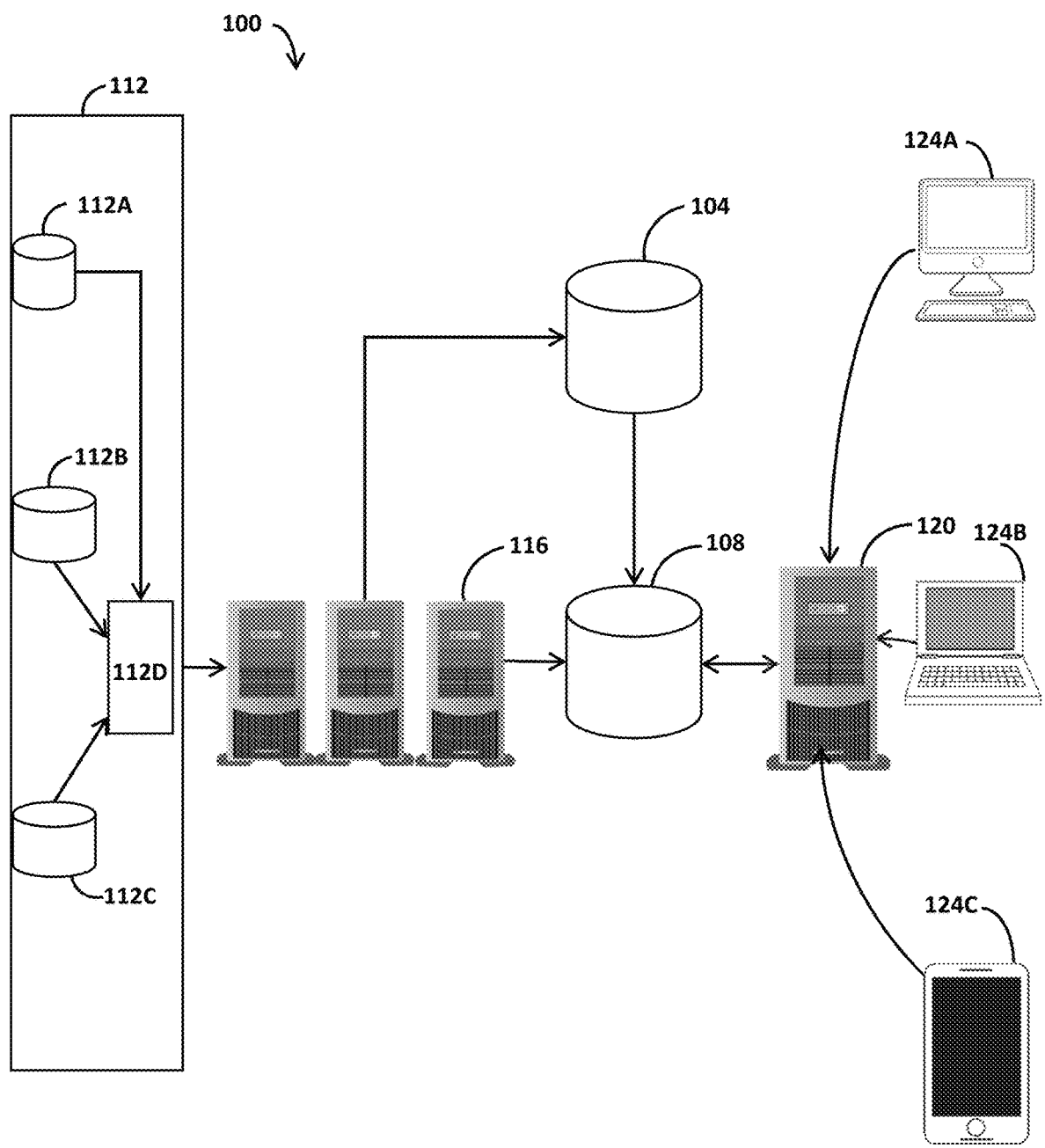
FIG. 1 shows a computing system for populating a first structured database having a set of customer intent data sets and a set of expression data sets corresponding to the set of customer intent data sets, and a second structured database having a set of answer data sets corresponding to the set of customer intent data sets, according to an illustrative embodiment of the invention.

FIG. 1 shows a computing system 100 for populating a first structured database 104 having a set of customer intent data sets and a set of expression data sets corresponding to the set of customer intent data sets, and a second structured database 108 having a set of answer data sets corresponding to a set of customer intent data sets, according to an illustrative embodiment of the invention. The computing system 100 includes one or more databases 112 including one or more data sources 112A, 112B, 112C having customer message data. For example, as shown, the data source 112A includes customer chat log data, the data source 112B includes customer phone call transcripts, and the data source 112C includes customer search query logs. Each of the data sources 112A-112C can be stored over a Hadoop cluster node and can be in communication with a data query interface layer, for example the hive 112D as shown.

The computing system 100 also includes a computing device 116 in electronic communication with the database 112. Data from the database 112 is provided to the computing device 116, which can include, for example, one or more hardware computing machines. The computing device 116 is configured to automatically discover customer intent data sets, expression data sets for the customer intent data sets, and answer data sets corresponding to the customer intent data sets, for example according to the algorithms, features and functions discussed in greater detail below. The computing device 116 is in electronic communication with the databases 104, 108. The computing system 100 also includes a server 120 (e.g., a hardware server computing device) that is configured to interface with one or more customer devices 124 (e.g., the desktop computer 124A, the laptop computer 124B, and/or the mobile phone 124C as shown).

To populate the first structured database 104, the computing device 116 is configured to receive customer message data from the one or more data sources 112, e.g., 112A-112C; extract, from the customer message data, data sets representative of a set of customer questions; pre-process the data sets representative of customer questions using one or more filters, thereby producing pre-processed data sets representative of customer questions; extract, from the pre-processed data sets representative of customer questions, a set of customer expression data sets; group the customer expression data sets into a set of clusters, each cluster representing one customer intent data set, each customer intent data set corresponding to one or more customer expression data sets; and store the customer intent data sets and the customer expression data sets in a structured database (e.g., the database 104) in electronic communication with the computing device 116.

To build the second structured database 108, the computing device 116 is configured to identify, within a database 112 in electronic communication with the computing device 116, one or more data locations at which a customer has previously asked a question corresponding to the customer intent data set; generate a candidate answer set based on one or more previous responses to the question corresponding to the customer intent data set, the candidate answer set having one or more possible answers; detect, for each of the possible answers, one or more features of the possible answer; determine, for each of the possible answers, based on the one or more features of the possible answer, a noise probability estimation of the previous responses using a noise probability estimation algorithm; determine, for each of the possible answers, one or more core answer features based on the noise probability estimation of the prior responses; extract, for each of the possible answers, a core answer candidate based on the one or more core answer features using a core answer extractor algorithm; rank the core answer candidates using an answer ranking algorithm, thereby determining a best answer candidate; generate a normalized answer based on the best answer candidate; and repeat the above for additional customer intent data sets for which answers are sought. The technical details of these steps are discussed in greater detail in the figures and explanation that follow.

Figure 2A:
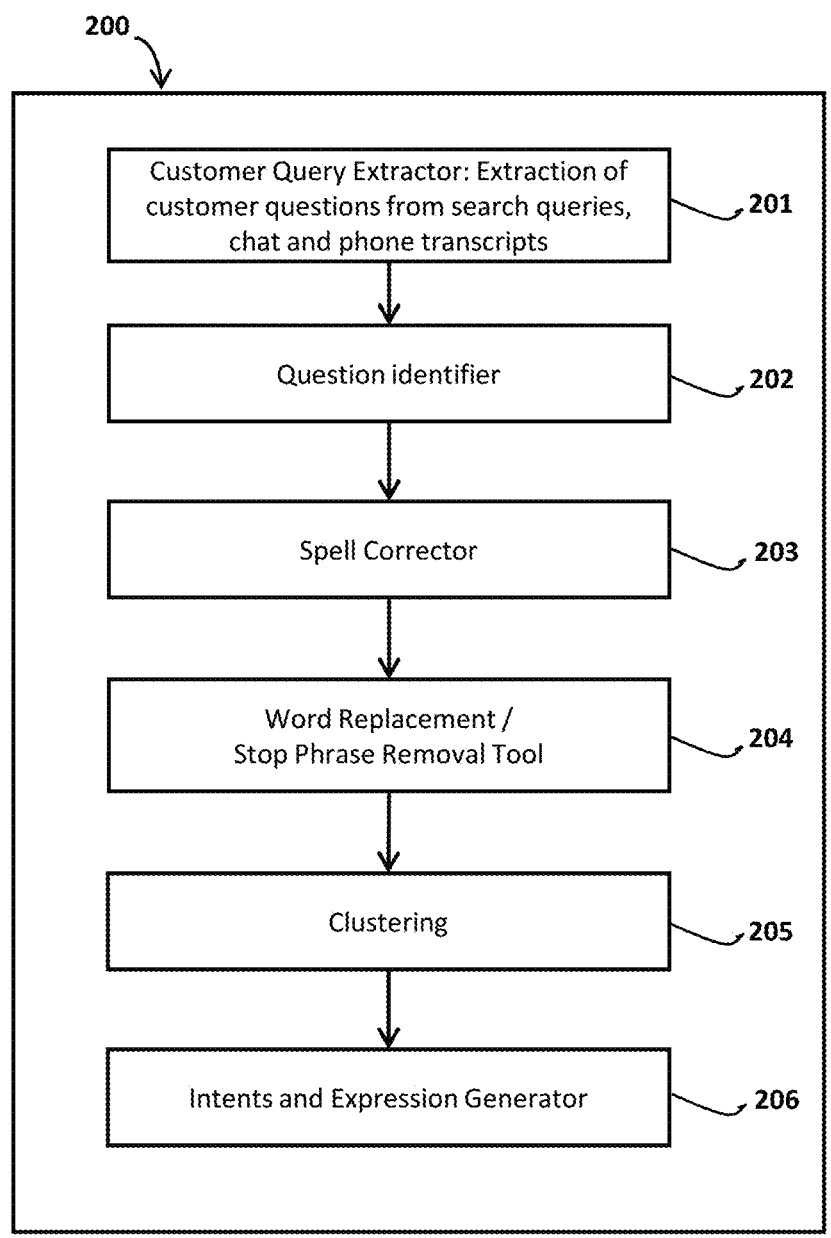
FIG. 2A is a schematic diagram showing a first computing module for discovering question intents, according to an illustrative embodiment of the invention.

FIG. 2A is a schematic diagram showing a first computing module 200 for discovering question intents, according to an illustrative embodiment of the invention. The first computing module 200 can be implemented within the computing device 116 shown and described above in FIG. 1. The first computing module 200 can be focused on discovery of questions, intents, and/or various expressions corresponding to the intents. An example of an "intent" and its corresponding expressions and answer is shown below in Table 1.

| Intent | Expressions Corresponding to Intent | Answer |
|---|---|---|
| Are there any fees for the Roth IRA? | One question I had was what fees are associated with my Roth IRA account? Also what are the fees for the Roth ira? Roth IRA new what are the fees? Also what fees will there be on the Roth ira? And what are the fees for a Roth ira? Now for the Roth IRA what are the fees? Are there any fees for the Roth ira Where on the website can I see what the fees are in my Roth ira? Are there any fees associated with fidelity's Roth ira? Are there any fees for the Roth ira Hello I am looking to see what fees and costs are associated with having a Roth IRA with fidelity? Are there any fees or restrictions on the Roth ira? | There are no fees for opening and maintaining this account. There are certain commissions that come with trading within an account, but none specific to a Roth IRA. There is a $50 fee when you close the account. This is to maintain documents and records for your future use. |

| Intent | Expressions Corresponding to Intent | Answer |
|---|---|---|
| | And one more question what fees are their for a Roth ira? | |
| | Are there any fees to keep the Roth ira? | |
| | I wanted to know what are the fees on a Roth ira | |
| | Are there any fees annual or otherwise on a Roth IRA account at fidelity? | |

In some embodiments, the first computing module 200 performs the above extraction using the series of submodules 201-206 shown in FIG. 2A. Submodule 201 is a first pre-processing submodule or "Customer Query Extractor," which receives raw data from sources maintained by the enterprise, such as chat logs, phone call transcripts, and search query logs (e.g., data sources 112A-112C shown and described above in FIG. 1) and extracts relevant text. Enterprise data containing chat logs, phone call transcripts and web-search queries is stored in various databases. This method involves making a query to enterprise databases to extract only customer utterances, e.g., chat messages or queries in the raw form. All such messages, queries, and/or utterances derived from multiple databases are consolidated into one single list.

Submodule 202 is a second pre-processing or "Question Identifier" module, which receives the extracted text from submodule 201 and selects valid questions from a conversational chat, which can include social talk, business questions, statements, and other forms of extraneous text. For example, submodule 202 can filter for queries that meet certain screening criteria, e.g., length, or whether queries contain "W" words such as who, what, where, when, why (and how). Questions in the conversational text data may be embedded as part of larger sentences, may be incomplete, or may be personal in nature. The goal of submodule 202 is to produce clean, complete, valid, non-personal questions for which unique answers can ultimately be discovered.

In some embodiments, submodule 202 includes one or more of the following functions. First, each data set of messages, conversations, or other exchanges is split into sentences using a sentence tokenizer. Second, each sentence is tested to determine whether it needs to be further decomposed. For example, all sentences are analyzed for the presence of a subordinating conjunction, or word that connects a main clause to a subordinate clause. If a subordinating conjunction is found, a length on both sides of the conjunction is analyzed along with the context of words around the conjunction to arrive at decision of whether further decomposition within the sentence is required. In some embodiments, the parts of a sentence preceding and following the subordinating conjunction are independently analyzed if they make up a complete sentence in itself, in which case the original sentence is replaced by two part sentences. (Example: 'I have opened IRA account but is there a way to buy stocks in it?" is replaced by two sentences "I have opened IRA account" and "Is there a way to buy stocks in it?"). In some embodiments, if a length of any of any sentence is fewer than 3 words, the sentence is not decomposed. In some embodiments, if a latter part of the sentence does not have grammatical structure of a complete sentence, the original sentence is not decomposed. In some embodiments, very small sentences (e.g., up to 3 words) or very large sentences (e.g., at least 15 words) based on token length are filtered out. In some embodiments, this threshold is set based on histogram based analysis on the corpus of data that is under examination.

In some embodiments, submodule 202 also includes one or more steps to classify text as either a statement or a question. First, any sentence that ends with a question mark is construed as a question. Second, a corpus of "W-phrases" is built using a labeled dataset of questions and extracted n-tokens starting with a "W-word." From each question in a labeled dataset of questions, a text phrase of n tokens (words) starting with the 'W' word is taken. For example, in the labeled question "Can you tell me where do I download IRA form?" the n-tokens text phrase with n=3 is "where do I." This n-tokens phrase can be referred to as "question phrase." Such phrases can be representative of questions. These phrases, once formed from a labeled dataset of questions, can be used to identify whether a new given sentence is a question or merely a statement. For example: If a labeled data set of questions having 10,000 questions is used, many unique question phrases (perhaps 6,000) would be obtained. With that information, a new sentence can be predicted, e.g., "Do you know where do I find my account balance" is a question because it contains the phrase "where do I," which is one of the question phrases.

Thus, question phrases derived from set of known questions can help tag a new dataset of sentences with a question or a statement bucket. This is because while the remaining part of questions vary, question phrases generally remain a closed set (e.g., containing phrases like "How much should," "When would you," etc.). If a 'W' word is not found, n-tokens are extracted from first word of the question. The sequence of n-tokens is called a "question phrase." In some embodiments, the W-words include "Who," "Which," "When," "Where," "Why," "What" (and/or "How"), and/or helping verbs such as "Can," "Was," "Were," etc. In some embodiments: (a) a different list of question phrases is formed for different values of n, starting from n=3 to n=8 (this refers to findings question phrases for different values of n from n=3 to n=8); (b) if any question phrase contains a domain entity (e.g., 401k), that question phrase is dropped; (c) a list of sequences of words is outputted which, if present in a sentence, indicates that the message is a question; (d) all the lists of question phrases are consolidated and clustered to assign a label to each cluster based on possible question types. A K-means clustering algorithm can be used to cluster the "question phrases" with tf-idf representation of each question phrase. Question types are possible classes into which a question can fall into and can vary from company to company. The traditional Question Types available publicly are "Number," "City," "Country" (refer, e.g., to Li and Roth taxonomy http://cogcomp.org/Data/QA/QC/definition.html). The current approach allows definition of what question classes exist in a particular domain and also helps in detecting whether a particular sentence is a question or a statement.

Figure 2B:
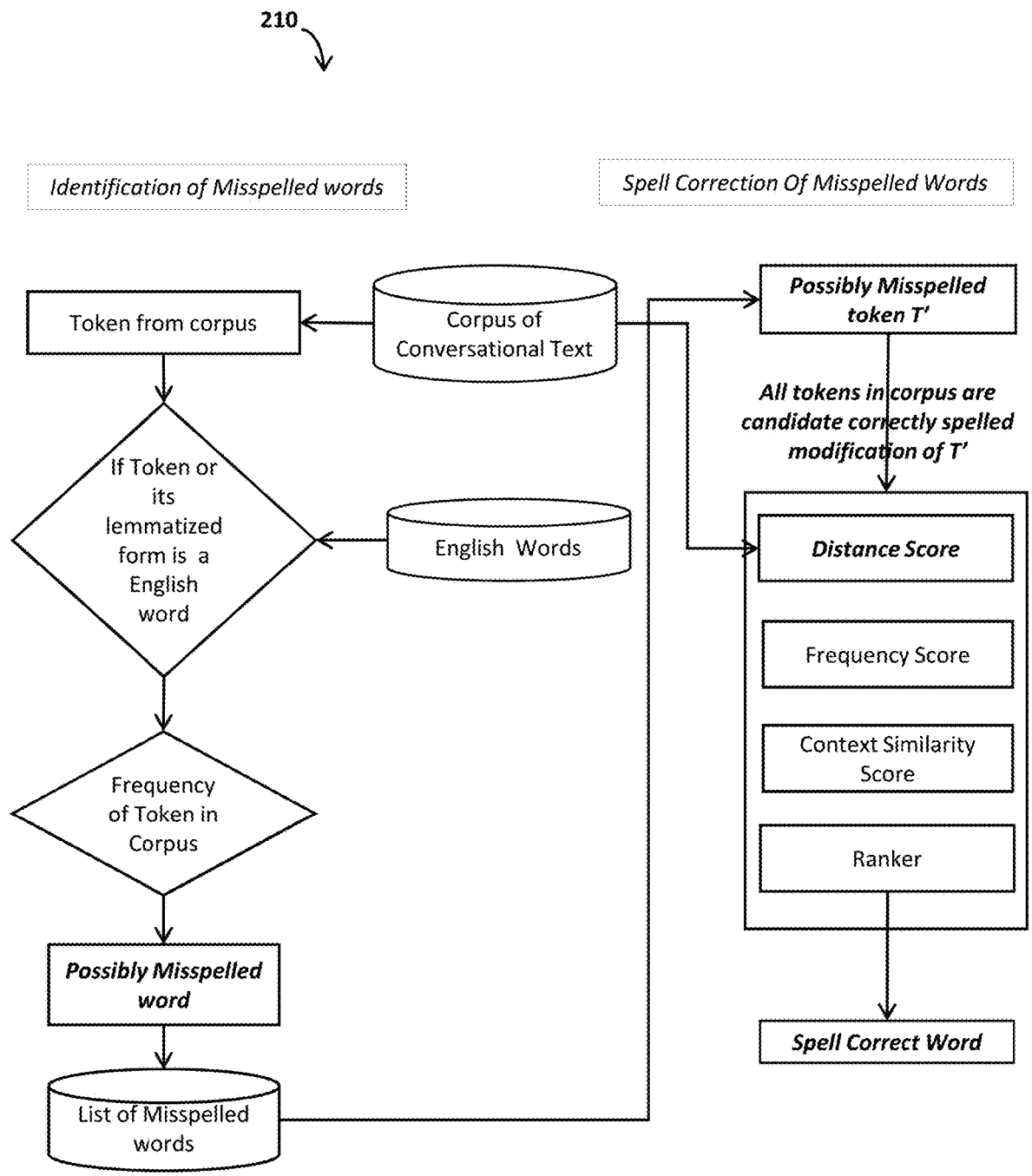
FIG. 2B shows a schematic diagram of a spell corrector module, according to an illustrative embodiment of the invention.

Submodule 203 is a third pre-processing module or "Spell Corrector," which receives output from submodule 202 and performs a spell correction and related functions such as acronym expansion, using suggestions of correctly spelled words from a large domain-specific corpus of text. This module has two broad components: (1) identification of misspelled words, and (2) correction of misspelled words. FIG. 2B shows a schematic diagram of a spell corrector module 210, according to an illustrative embodiment of the invention.

With respect to the first "identification of misspelled words" component, given a corpus of conversational text (e.g., a large number of historical logs containing conversations between customer service agents and customers in text form), with both correctly spelled and misspelled words, and a test customer query, the objective is to find what words in a query are potentially misspelled in the test customer query. In some embodiments, the first "identification of misspelled words" component includes one or more of the following functions. First, the test query is tokenized into individual words called tokens. If the word is a number, it is not potentially misspelled. If the word is not a number, it is lemmatized. Second, it is determined whether the word or its lemmatized form appears in English vocabulary (e.g., based on a database of English words). Third, the percentage frequency of the lemmatized word in the corpus of historical logs is found. If the percentage frequency is low (e.g., below 0.02% for a large data set—although this number greatly depends on the variations found overall in the customer query dataset) that word may be potentially misspelled.

With respect to the second "spell correction of misspelled word" component, in some embodiments the invention includes one or more of the following functions. First, for a possibly misspelled token "T", words are identified from the chat corpus that is closest to the potentially misspelled word. The closeness is estimated using a "Levenshtein distance" algorithm. The Levenshtein distance is a string metric for measuring the difference between two sequences. Informally, the Levenshtein distance between two words is the minimum number of single-character edits (insertions, deletions or substitutions) required to change one word into the other. All words in the corpus within a certain Levenshtein distance threshold ($T_1$) from the potentially misspelled word are taken into consideration. This set of words is called "Correctly spelled words under consideration" (CSWUC). If there is no word within the threshold, the algorithm ends, making no change to the potentially misspelled word. Second, the frequency of each word in CSWUC in the corpus is identified. If the frequency is more than a threshold ($T_2$), the word is retained as part of CSWUC; otherwise it is removed. Third, the similarity of context of misspelled words is identified with the context of words in CSWUC, and a context similarity score is provided. Fourth, scores of distance, frequency and context similarity are merged to rank words under CSWUC. The scores are merged using the logistic regression with weights tuned during the training on labelled dataset of a small set of misspelled words and their correct spellings. The weights would differ based on the data set. The word with highest score is identified and used as the correctly spelled replacement for a potentially misspelled word.

The above methods carry advantages over traditional spell detection logic, which does not handle multiple problems associated with conversation text of a particular domain. First, traditional algorithms are based on distance calculations from words around an "English word" vocabulary. Thus, the domain words like 'TOA' (which is an acronym for 'Transfer of Assets'), which are valid words in certain domains (e.g., financial lingo), are considered as misspelled words by mostly all traditional algorithms, which look for a match in English vocabulary. Second, traditional algorithms do not do a good job of finding the right replacement for misspelled words, because (a) they do not consider the context of words that normally occurs in a specific domain into account to make the right prediction, and/or (b) they do not account for specialized lingo, acronyms, and/or terminology associated with a particular domain. For example, for the question "How can I complete toa from my 401 account?," traditional algorithms may consider 'toa' as a misspelled word due to their lookup in a standard English dictionary. However, in reality while 'toa' is a correctly spelled word, '401' has been misspelled. Based on the high frequency of word '401k' in the relevant corpus, a very low distance score with the misspelled word '401' and a high probability of '401k' appearing in between "toa from my" and "account," the present invention can adapt to domain vocabulary and correctly predict that the replacement of the misspelled word "401" is "401k."

Figure 2C:
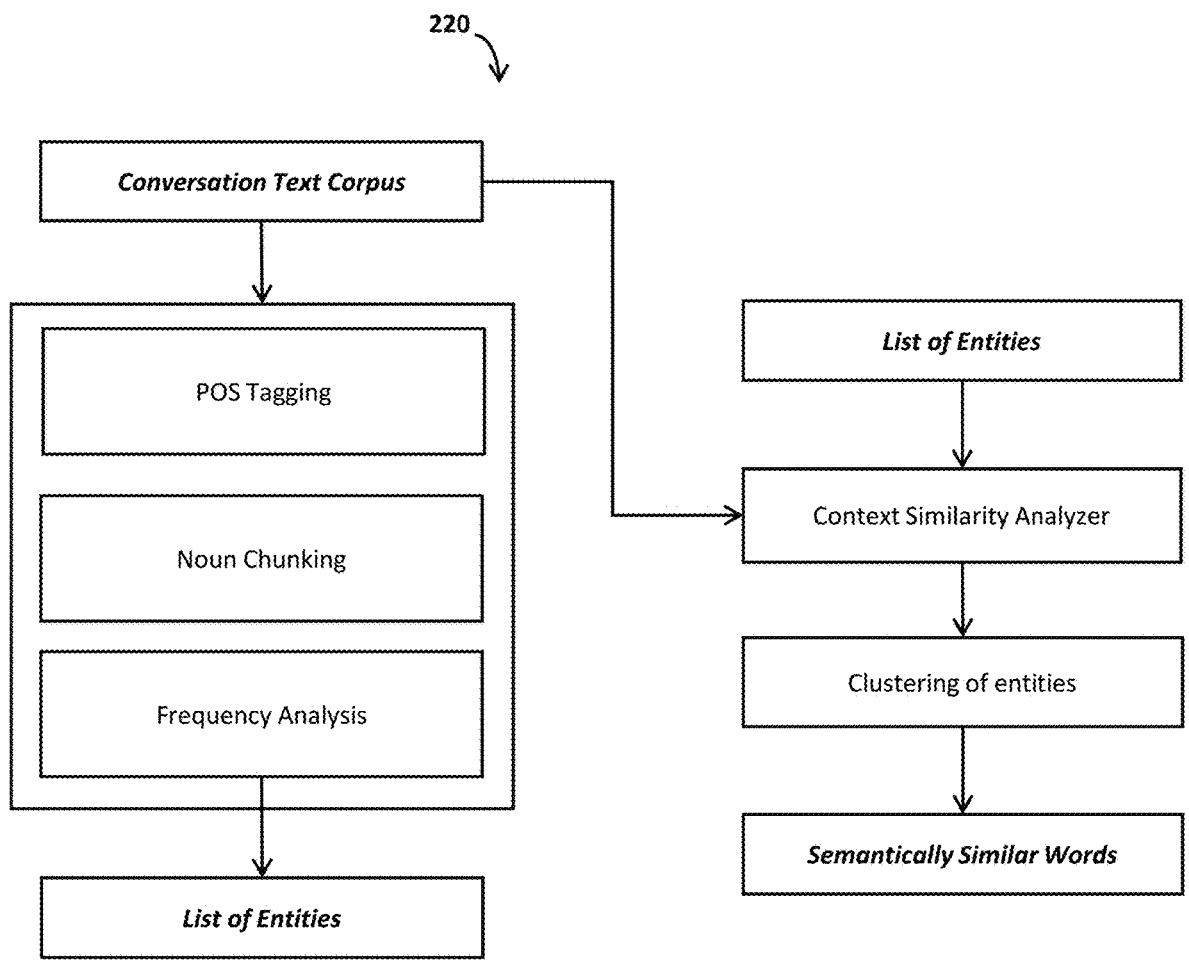
FIG. 2C shows a schematic diagram of a word replacement and stop phrase removal tool module, according to an illustrative embodiment of the invention.

Submodule 204 is a "word replacement and stop phrase removal tool," which receives output from submodule 203 and performs cleaning up along with replacement of synonyms by an agreed entity name. This uses the entities from a large domain specific corpus of text (C1). FIG. 2C shows a schematic diagram of a word replacement and stop phrase removal tool module 220, according to an illustrative embodiment of the invention. For each question in a question corpus, each word can be tagged using a "Part-of-speech" tagger and only the words which are nouns can be extracted. If two or more consecutive words are nouns, the whole phrase is considered as one for further analysis (called as 'noun chunking'). Each unique noun or noun chunk is considered as an entity. Thus, from a large set of question corpus, entities such as the following may be obtained: "401k account", "tax office" etc. The frequency of each unique entity is found across the corpus. At the end, the sorted list of entities (e.g., noun entities) is obtained, with those entities that are most spoken about (i.e. having large frequency) remaining at top of the list and those that are sparsely talked about remaining at the bottom of list. The similarity is found in context (neighboring words) of these entities, and it is used to cluster the entities into different groups. All entities within each group are then replaced by one text label which is representative of the group. For example: "401k account", "401k", "401k retirement account" can lie in one cluster, given the high similarity in their context words in the corpus of questions. This cluster can be represented by one single label (e.g., "401k"), which can replace all entities under this cluster.

Submodule 205 receives pre-processed text from submodule 204 and performs unsupervised semantic clustering using a novel clustering algorithm. The objective of submodule 205 is to discover the unique "intent" questions and expressions given the list of questions as found by the question detection layer. Intent and Expression Discovery proceeds using two broad steps: (1) text normalization; and (2) clustering into intents, which involves sub-steps of (a) present group identification, and (b) agglomerative clustering.

Consider two sentences: (1) "What's the process of opening an IRA account?" and (2) "I want to know how do I go about setting up an Individual Retirement account". In (1) there is no noise, the Qtype is "process", the action is "open" (opening), and the Account Entity is IRA ("IRA account"). In (2), the noise is "I want to know", the Qtype="process"

(how do I go about), the action is "open" (setting up), and the Account Entity is IRA ("Individual Retirement account"). The following metadata information is extracted from each question: 1) The type of question called "QTYPE" 2) Key Actions 3) Key Account Entities. This information is used to divide the set of questions into present groups. QTYPE refers to as specific class of type of question, and each cluster question has one Qtype. Key actions are found by using part-of-speech tagging and looking at verbs and their synonyms. Key Account entities are noun entities as explained previously. Before the algorithmic distance-based clustering is performed on all questions found across various channels to form unique intent groups, the questions are grouped into preset groups based on type of question (generated as a byproduct of question detection), product category, business units and key actions. The intuition here is that two questions having different question types (like question type: 'quantity' and question Type: 'timeline') are certain (or near-certain) to constitute different intents and can be separated prior to clustering. Similarly, two questions concerning different 'products' (like 'brokerage account' and '401k') are certain (or near-certain) to constitute different intents. Then, questions belonging to each possible combination of Qtype, Product category, business unit and key action are construed as a unique preset group. An illustration is shown below in Table 2:

252A), which include (or at least substantially include) one or more intents (e.g., 254 A-C, corresponding to group 252A). Agglomerative clustering is performed within each preset group 252A-H at different thresholds of "distance" above which two questions cannot be put into same cluster. For example, distance between averaged word vectors of two questions can be used. Each cluster 254 represents an intent (e.g., cluster 254A represents one intent, cluster 254B another, and cluster 254C another, all within preset group 242C). In each preset group, clustering is done at a threshold $T_1, T_2, \ldots, T_n$ in increasing order resulting in intent clusters $I_1, I_2 \ldots, I_n$. The agglomerative cluster formation is stopped if the distance between candidate clusters exceeds a threshold. For each set of intent question clusters $I_i$, answers are mined, resulting in answer set $A_i$. Each set of $A_i$ has I questions intents mapped to A answers. For each set A, the average similarity score representing an average of similarity of answers found for different expressions for the same intent is found. The most optimal set (among $I_1$ to $I_n$) and correspondingly the most optimal threshold (among $T_1$ to $T_n$) is chosen which has highest average answer similarity score. By comparison to traditional algorithms, when clustering questions traditional clustering algorithms look only at intra- and inter-cluster distance in a question space. In contrast, the present invention looks at both distances in

| Q# | Question | Question type | Product Category | Business Unit | Key Action |
|---|---|---|---|---|---|
| 1 | How do I open ira account? | Process question | IRA | Retirement accounts | 'open' |
| 2 | How do I setup a 401-k account? | Process question | 401k | Retirement accounts | 'open' |
| 3 | What is the method to enroll into a new Individual Retirement account? | Process question | IRA | Retirement accounts | 'open' |
| 4 | Let me know when I can change my profile for my 401k? | Timeline question | 401k | Retirement accounts | 'modify' |

Only question numbers (Q #'s) 1 and 3, which belong to same preset group, are compared with each other to see if they belong to same intent. For other expressions, preset grouping already separates the expressions from each other. The benefits of dividing the list of questions into distinct preset groups can help to efficiently employ the clustering process as a next step.

Submodule 206 (Intents and Expression Generator) receives output from submodule 205 and generates intents and expressions mapped to it based on clustering results. The output is intent groups, expressions and business related tags, saved in a repository (for example, back into a new database within the same Hadoop cluster system, at a different node). Output received from submodule 205 (e.g., intent label, member questions, and preset group tags) is loaded into a new database.

Figure 2D:
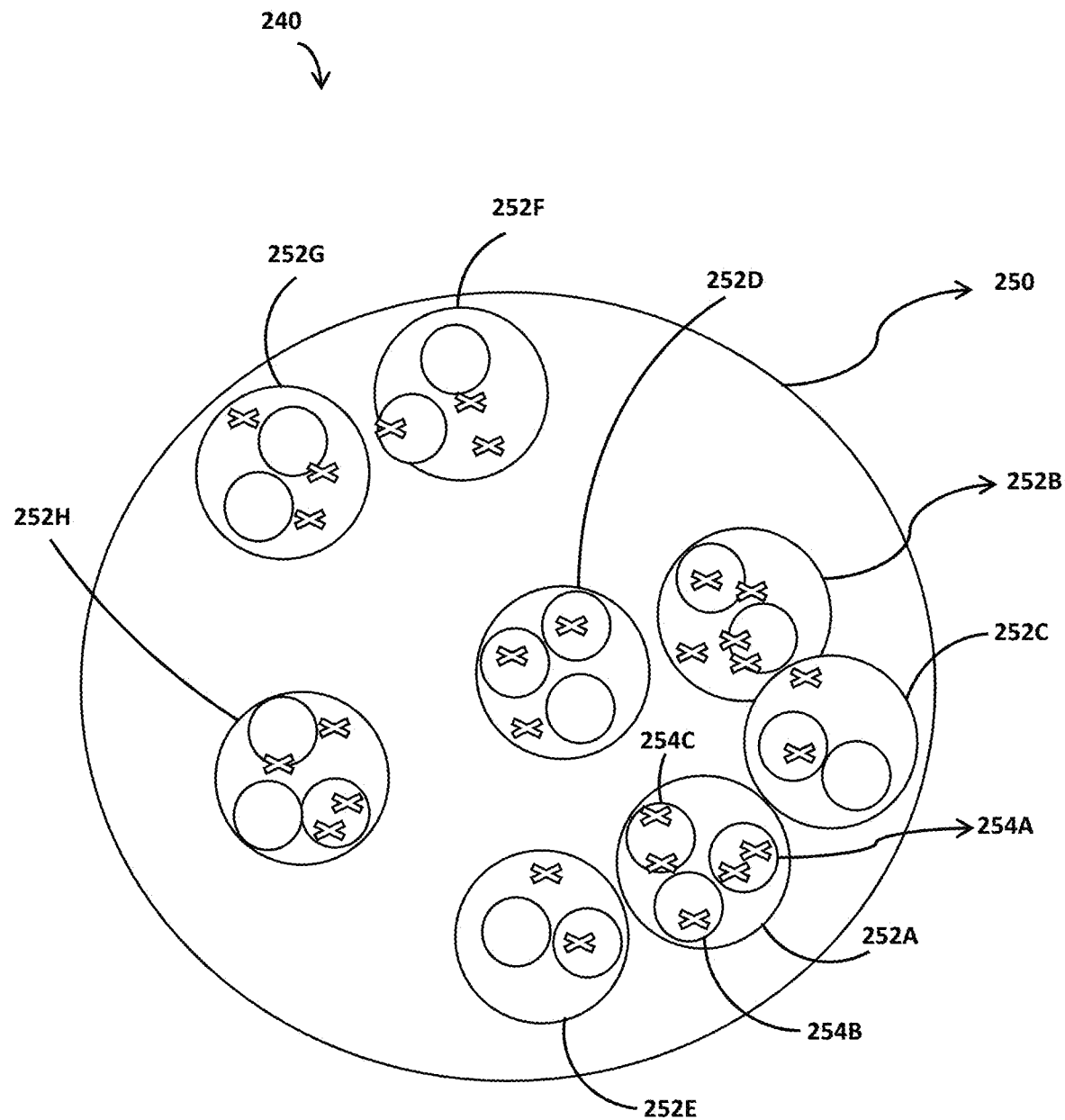
FIG. 2D is a visual diagram of agglomerative clustering, according to an illustrative embodiment of the invention.

FIG. 2D is a visual diagram 240 of agglomerative clustering, according to an illustrative embodiment of the invention. This is an illustrative diagram of the question space, with each question represented as a point marked by the symbol X. The position of each question (the point) comes from the vector representation of the question. The question space 250 is divided into preset groups 252 (e.g., group "question space" as well as in mapped "answer space" to determine optimal cluster formation.

Figure 3A:
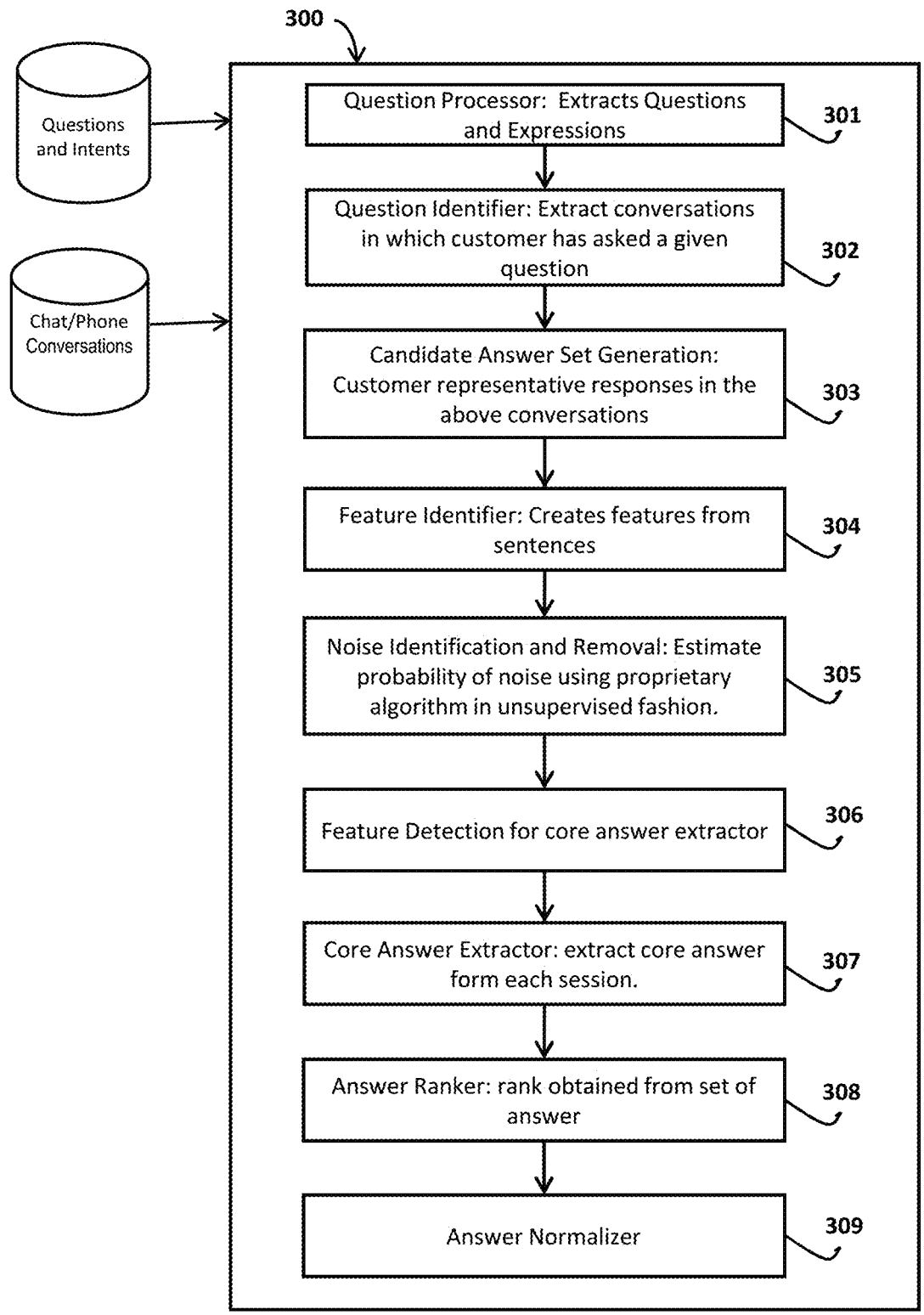
FIG. 3A is a schematic diagram of a second computing module for discovering answers to the question intents discovered by the first computing module of FIG. 2A, according to an illustrative embodiment of the invention.

FIG. 3A is a schematic diagram of a second computing module 300 for discovering answers to the question intents discovered by the first computing module 200 of FIG. 2A, according to an illustrative embodiment of the invention. The second computing module 300 can be focused on discovery of answers corresponding to the intents uncovered by the first computing module 200, and can also be implemented within the computing device 116 shown and described above in FIG. 1. Discovery of customer intents and expressions described above can result in a large number of possible customer questions for a given business topic of interest. Given the sheer number of customer intents, the process of finding possible responses for these known customer intents is automated in the present invention.

To illustrate, FIG. 3B shows an annotated transcript 310 between a client (or customer) and an agent (or customer representative), according to an illustrative embodiment of the invention. The correspondence between client questions and the agent answers to be extracted are shown in annotated pairs on the figure. For example, the question corresponding to subscript "1," "how to open a roth ira account online?"

has the two-line answer "here are the steps you can use to open a new roth ira online:" "#. click the open an account link on fidelity.com #. select open online next to roth ira you can also view this web page by accessing the link below: open-account overview."

In performing this identification, a number of challenges need to be overcome. First, it cannot be determined beforehand when the answer has been given by the representative after the customer has asked the question, e.g., in the above example, the answer to one question comes after multiple (e.g., four) agent replies, and the answer spans other questions and answers. Second, as live chats are human-to-human conversation, they often include sentences that do not necessarily answer the given question, but are present in conversational chat for various reasons (e.g., in Table 3 the sentence "that's something i can definitely help you with. we appreciate you considering . . . "). These types of messages, called "conversational noise," vary from one conversation to another due to subjectivity and context of conversation. The precise start and end of an answer or components of answer in a session is also not known, a problem known as boundary detection. Third, an aim of the invention is to generate customer-ready answers in the highly regulated financial industry for an established firm. Thus, in addition to the answer being factually correct, it must be politically correct, well-phrased, and free from any English language grammatical and syntactic mistakes.

Module 301 is a QuestionProcessor Module that takes as input the Question Intents (e.g., output from Module 200) and extracts a list of Questions and Expressions from Question Intents to be processed by Module 302 (along with Phone/Chat Conversations).

Module 302 is a question identifier, which receives two inputs: the Questions and Expressions from Module 301, and the phone/chat transcripts that reflect conversation between representatives and customers. Module 302 identifies the location of each of these questions in the chat/phone conversations. In this module, the various expressions for a given question are matched with every sentence from the customer messages. In some embodiments, the algorithms used are Exact String Match and near duplicate match using the Character Edit distance with a threshold greater than 90%. In addition, a semantic similarity can also be performed in which the sentences and the questions are converted to their Word Vectors and again, the Vectors are compared to check if there is a match greater than 90%. 90% is a configurable number—it may be the best threshold for high precision in many cases. If the match is present, then the given question is deemed to be present in the sentence of the customer conversation. If a given Question occurs 'N' times in the chat/phone conversations, the location of these questions (e.g., the file name and the exact sentence at which this occurs) is passed on to Module 303 for further processing. Hence, the Module 303 takes as input for all the Question Intents from Module 200 the location of each of these questions in the Chat and Phone conversation.

Module 303 is a Candidate Answer Set Generation module, and allows the institution to generate a candidate set of answers for the question. As shown in FIG. 3B, the Agent responds to the customer question and, as above, the exact location of the answer or components of answer varies from conversation to conversation. Hence, this module extracts the next 'N' Agent responses, where 'N' is a configurable. As an example 'N' can be chosen to be 5 since it is usually guaranteed that the answer for a customer question will be found within five Agent Responses after the customer question occurs in both chat and Phone transcripts. The downstream modules focus on finding the right answer in the Agent Responses.

Module 304 is a Feature Identifier module. Module 304 first splits the Agent Responses from Module 303 into sentences. The module then forms the following features for each of the sentence: (a) the Inverse Document Frequency (IDF), and (b) the Frequency, which forms one of the inputs to Module 305.

Figure 3C:
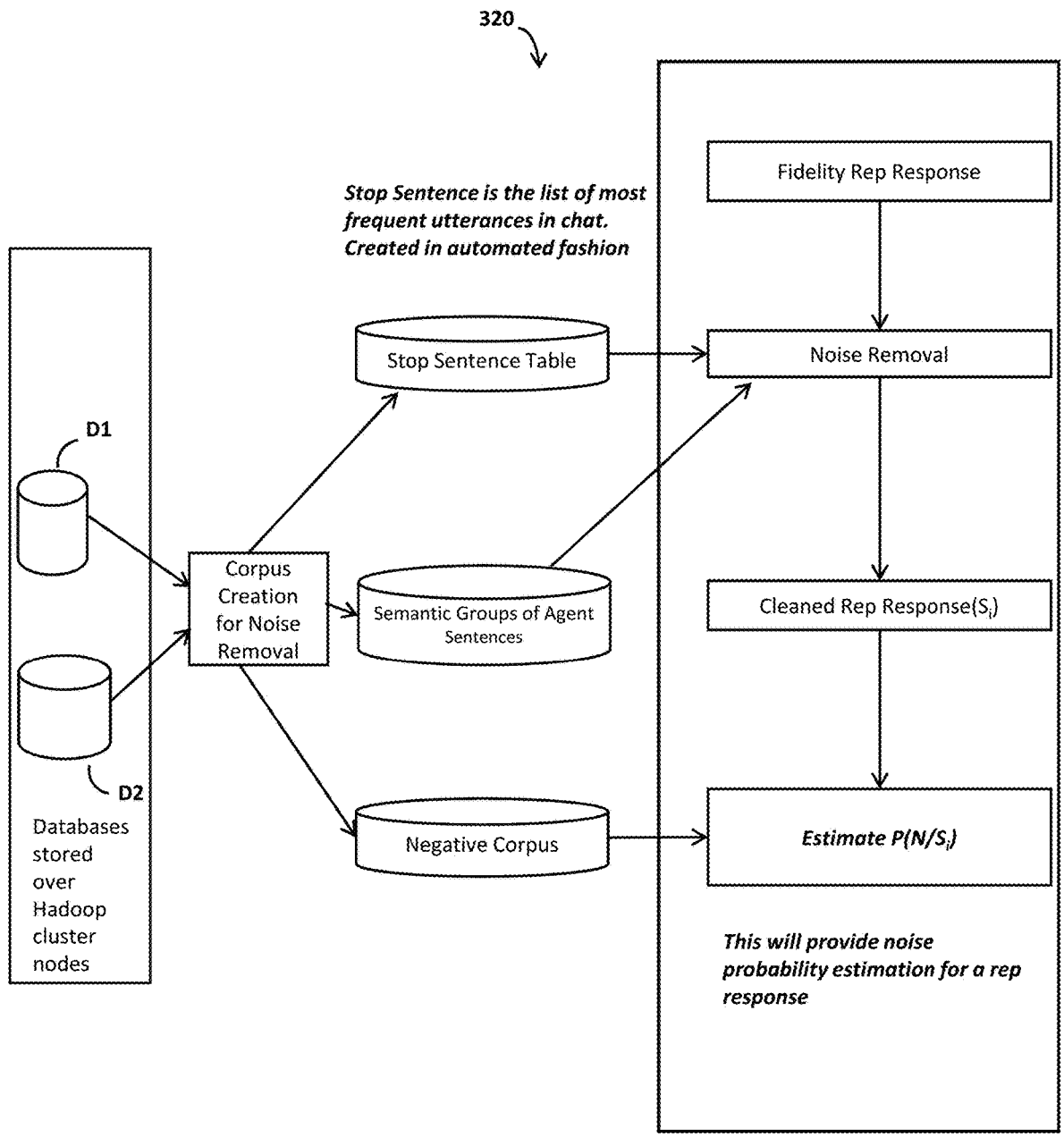
FIG. 3C shows a schematic diagram of an unsupervised noise identification and removal module, according to an illustrative embodiment of the invention.

The block diagram for Module 305 is shown in detail in FIG. 3C. In addition to the features generated in Module 304, there are three other repositories from the Chat and Phone corpus created by a Corpus Creation Module 320 as shown in FIG. 3C which serve as input to Module 305. One is the "stop sentence" repository, which is used to store the entire stop sentences from the source corpus. With the "stop sentences," the idea of "stop words" in natural language processing is extended to sentences in the corpus to identify conversational noise in a chat session. The "stop sentences" is the list of most frequent utterances in the chat and is created in an automatic fashion. This list captures conversational noise that is used by representatives across chat sessions within the institution is written in a similar fashion across chat conversations. An example of a stop sentence is "Welcome to Fidelity Investments! How can I assist you today?". Since the representatives are trained to say/type the exact same phrase, they occur with very high frequency but are not useful as part of an answer. However, the entire spectrum of sentences that are irrelevant to the answer is not captured by Stop Sentences. For example, "thank you for taking the time to chat with me today morning" and "thank you for taking the time to talk to Fidelity investments" are noisy sentences but they will not occur with very high frequency. To capture these, the sentences that semantically mean the same thing can be grouped—they form the second repository called the "Semantic Group of Agent sentences". A sentence is represented in a vector space in which sentences corresponding to certain themes (e.g. an agent's sentence in which s/he is asking client to hold) have similar representations. For example, two common themes might be grouped as follows:

| Theme 1 | Theme 2 |
|---|---|
| please allow me a moment to review your question | thank you for invest with fidelity |
| please allow me a moment or two to familiarize myself with your plan detail | enjoy the rest of your evening take care |
| it will take me a moment or two to check into each for you | thank you for take the time to chat with me today |
| please allow me a moment to review the pension plan material | i appreciate you take the time out of your day to chat with me and i hope you have a great day |
| it will be just a few moments while i wait for your account and plan information to come through for me | thank you for take the time out to chat with me this morning |
| let me just check the time frames | thank you for invest with fidelity and have a good evening |

Another repository is the Noise Corpus, which is essentially the chat corpus segmented by topics. Each of these segmentation acts as a Negative Noise Corpus for the other topics.

The goal of the Module 305 is to identify sentences that are noise, and if the number of sentences deemed noise is very high for an Agent Response, that Response will be removed from the candidate answer. This determination of noisy sentences is done by using three different approaches in Module 305, specifically, "Stop Sentences", "Semantic Grouping of Agent Sentences" and "Probability Estimation". FIG. 3C shows a schematic diagram of an unsupervised noise identification and removal module, according to an illustrative embodiment of the invention. The invention includes multiple approaches to identify conversational noise, including "Stop sentences," "Semantic Grouping of Agent Sentences" and "Probability Estimation". As the first step, all the sentences that are "stop sentences" are removed from the Agent Response. As defined in the previous section, they are sentences that occur with very high frequency but of no value to the answer. With the "Semantic Grouping of Agent Sentences" approach, the themes that represent the noisy sentences are identified and can also be removed directly. These cleaned Agent sentences form the input to the "Probability Estimation" module. They deal with removing another source of noise that is not captured by both of the above approaches (e.g., sentences such as "if you ever need assistance with your tax or the withdrawal process we will be here for you"). Their frequency in the chat logs is low, and they do not fall into any semantic grouping of sentences. These are sentences used by Agents trained in specific areas like "Tax".

In order to detect these sentences, first segment the messages into topics like "Tax", "Retirement", etc. and consider the rest of the messages to be a "Negative Corpus". The hypothesis is that these sentences will have some frequency in their topics but will not be present at all in the "Negative Corpus". The "probability estimation" approach generalizes the example above. A customer representative message in a specific topic is compared with the Negative corpus (which are all the messages in the chat corpus except this specific topic), and the probability of the message being noise is calculated. Let the candidate Segments be $S_i$ and the Negative Corpus be $N_c$. The estimate of Probability of the sentence segment being noise, $P(N/S_i)$ using $idf_{nc}(S_i)$, is calculated on the Negative corpus. For example:

post-noise removal needs to be checked for relevance with the question. This module 306 generates features for each of the responses so that the algorithms in the Core Answer Extractor in Module 307 can use these features to retain a response or remove them. The set of features includes the following: the number of messages from the start of the session until the specific response (responses at the start and end of the session are likely to be not answers), the number of messages post the customer question (the closer the response is to the question, higher the chances of it being part of the answer), the number of customer messages between the question and the response, the likelihood of the response being an acknowledgement signal (the use of this signal is explained in the next section), the presence of another customer question between the original question and this response, the response converted to its semantic vector representation (like word2vec), a syntactic vector representation (like TF-IDF).

Module 307 is a Core Answer Extractor, which extracts a "core answer" from each "session." for a given question. Using the features from module 306, module 307 extracts the most similar representative communication across different conversations. Module 307 yields an answer from each of the conversations obtained after operation of module 302, hence a set of answers. As illustrated above, it is impossible or highly impractical to determine where an answer to a given question or intent is located, and the answer is likely hidden among noise and/or answers to other questions.

In some embodiments, module 307 extracts a core answer of a question using a multi-step process. First, a boundary of the core answer is detected. The goal is to predict reliably an end boundary of the answer. The idea is to categorize agent and client utterances into dialogue acts, which helps the algorithm to predict the start and end boundary of an answer in the session. For example, client utterances denoting acknowledgment that their questions have been answered can be termed as an acknowledgement signal. Examples of acknowledgement signal are: "wow, that's nice and straightforward;" "okay this make sense now;" "one more question;" "gotcha;" "yes, thank you very much, i appreciate your time and help." Both semantic and syntactic variation in the way client expresses their acknowledgement makes

| Sentences | Rank in Stop Sentence Corpus | Frequency in chat logs | idf(s) | P(N/S) |
|---|---|---|---|---|
| i know this is a lot of information please take a moment to read through it all and feel free to ask me any clarifying question | NA | <10 | .000314 | .999686 |
| since you are not enroll i would want to refer you to our workplace planning and guidance group so that they can set the contribution to zero and help elect a default fund for any employer contribution | NA | <10 | .000319 | .999681 |
| if you ever need assistance with your tax or the withdrawal process we will be here for you | NA | <10 | .000232 | .999768 |

Module 306 is a feature detection algorithm for the core answer extractor using a novel algorithm. The goal of the module 307 is to extract the right answers from the Agent responses in various chat conversations for a given question and module 308 (the Answer Ranker) will rank these answers using the features extracted in this module. In order to do that, each response from the Candidate answer set this problem complex to solve, and unsupervised modeling of client utterances can be used to uncover hidden classes in client data.

Second, the core answer can be extracted. After the candidate answers have been retrieved from a session, the next step is to extract the core answer using the similarity between the answers. For example, the correct answer in one session might be the third response after the question but in another session might be the first response. However, the answer should have a degree of similarity independent of their position of occurrence. This core idea is formalized in the algorithm below. In some embodiments, the following algorithm is used:

input(I): chat sessions where the question has been identified.

$I_n$=Number of chat sessions in I.

max response=maximum number of rep responses in I.

for n in [1, max response]:

$\{A_1, A_2, \ldots, A_m\}$=pick n number of rep responses from $\{I_1, I_2, \ldots, I_m\}$, m=$I_n$ simScore($S_k$)=ΣΣsimilarity($A_i$, $A_j$), I j=[1, $I_n$], j≠I N=n at which $S_k$ is maximized Select N number of responses from each session to extract the core answer.

Figure 3D:
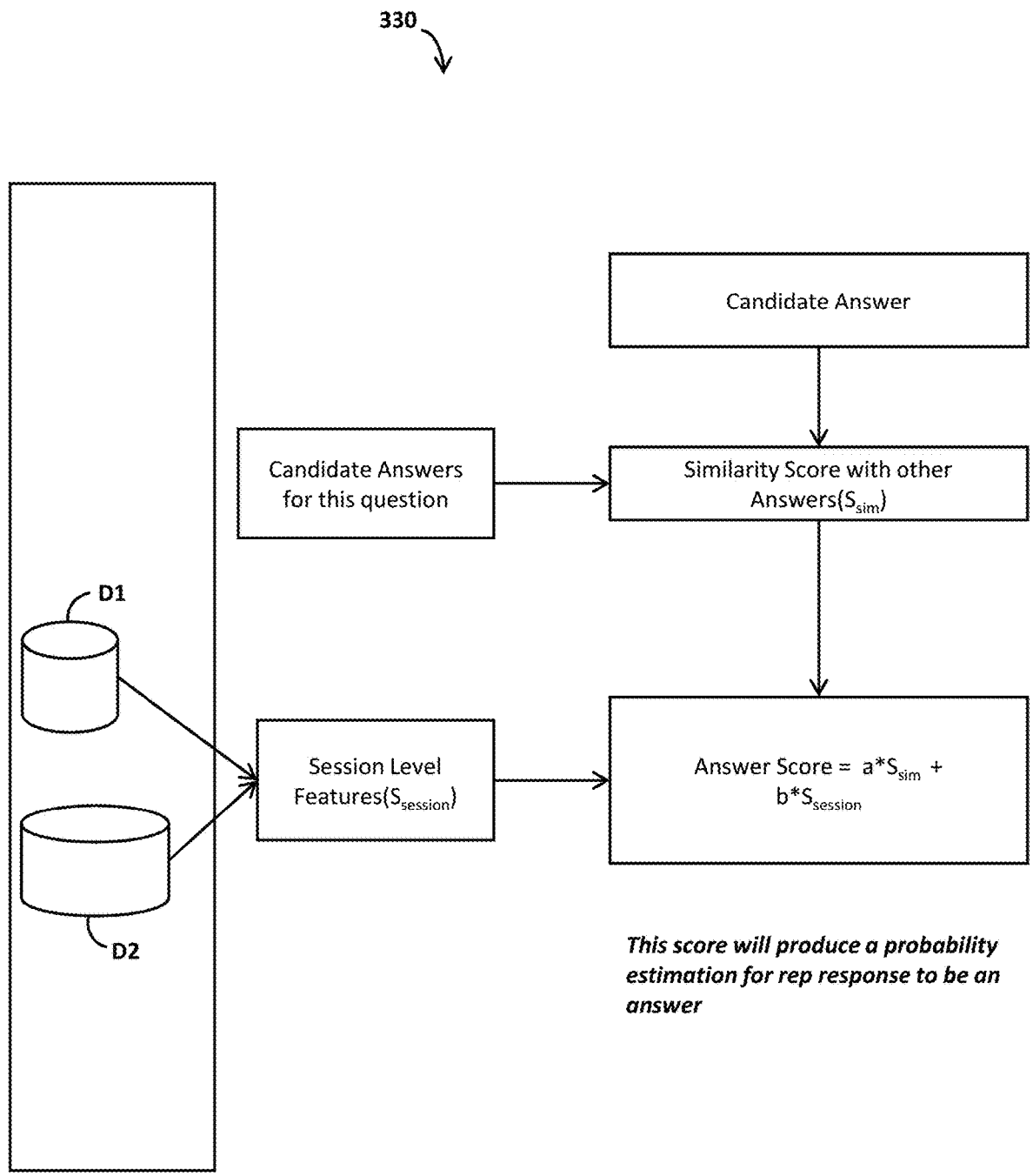
FIG. 3D shows a schematic diagram of an answer ranker module, according to an illustrative embodiment of the invention.

Module 308 is an answer ranker. The rank is obtained from the set of answers. Module 308 ranks the answer set from module 307 using the similarity scores from module 307 and the session level features from Module 306. Module 307 assigns the similarity score to a question/answer pair that reflects the quality of the question/answer pair, and therefore can be used to rank the answers when there are multiple answers available. These scores are then combined with the session level features in a linear fashion according to the schematic 330 shown in FIG. 3D and below.

Answer Score=$a*S_{sim}+b*S_{session}$

Figure 3E:
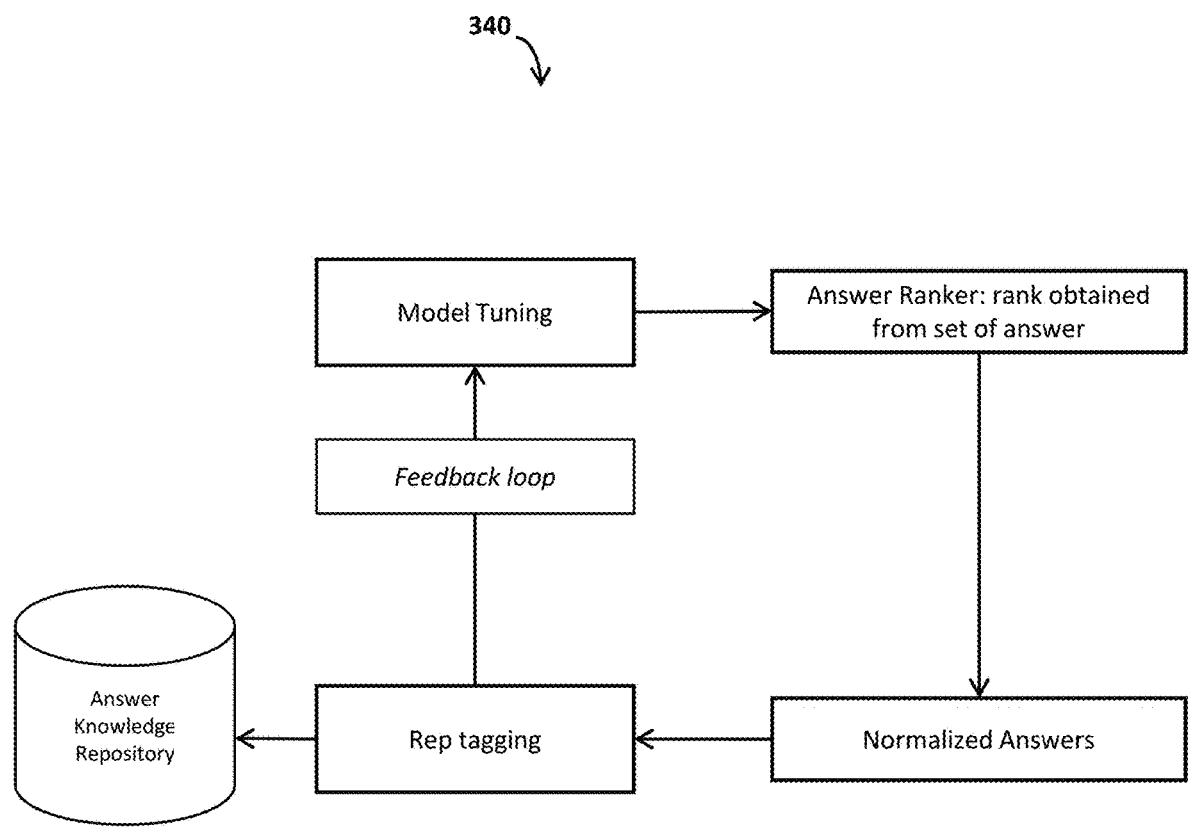
FIG. 3E shows a feedback loop used to derive a confidence score for a question-answer pair using a machine learning model, according to an illustrative body of the invention.

'a' and 'b' are weights that are assigned to arrive at the AnswerScore. These are initially assigned using "trial and error". However, a learning model is then used in the feedback loop for model tuning as shown in FIG. 3E. The weights 'a' and 'b' are parameters that are tuned using the feedback so that these weights are then automatically learned and adjusted.

Module 309 is the Answer Normalizer. Module 309 normalizes answers to make them presentable to a customer, e.g., by correcting spelling and grammatical errors. In order to do this, the spelling mistakes are first identified by running a spell checker and then the spelling errors are corrected by doing a lookup with the closest matching word in other equivalent answers present in other Agent responses. Similarly, any grammatical mistakes are corrected by first detecting them by constructing a Parse Tree and then replacing them with words from other Agent responses till the number of grammatical errors is minimized. Module 309 can also store the answer back into an answer knowledge repository, e.g., in another Hadoop cluster node built into the computing systems shown and described above.

FIG. 3E shows a feedback loop 340 used to perform model tuning for a question-answer pair using a machine learning model, according to an illustrative body of the invention. As explained above, numbers of features are used to derive the final score for a question-answer pair. These Question-Answer pairs are then tagged by reps for the "Answer Correctness", "Noise in Answer" and the "Grammatical correctness". The tagging is then used to adjust the various weights in the different modules described above automatically by using a machine learning model. The model can be a linear model like Logistic or non-linear model like Support Vector Machines (SVM).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. The computer program can be deployed in a cloud computing environment (e.g., Amazon® AWS, Microsoft® Azure, IBM®). Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7

(SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

In some embodiments, software elements used include Python (e.g, Python 2.7), Hadoop distribution, and/or PyQT. In some embodiments, hardware elements used include a computing system and Hadoop cluster nodes. In some embodiments, data sources used including databases storing customer chat interactions phone transcripts, and/or web search queries.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of populating one or more structured databases having a set of customer intent data sets and a set of customer expression data sets corresponding to the set of customer intent data sets, the computerized method comprising:
   receiving, by a computing device, customer message data from one or more raw customer conversation data sources;
   extracting, by the computing device, from the customer message data, data sets representative of a set of customer questions;
   pre-processing, by the computing device, the data sets representative of the set of customer questions using one or more filters, thereby producing pre-processed data sets representative of customer questions;
   extracting, by the computing device, from the pre-processed data sets representative of customer questions, a set of customer expression data sets;
   grouping, by the computing device, via unsupervised semantic clustering, the customer expression data sets into a set of clusters, each cluster representing one customer intent data set, each customer intent data set corresponding to one or more customer expression data sets; and
   storing, by the computing device, the customer intent data sets and the customer expression data sets in a structured database, the structured database in electronic communication with the computing device,
   wherein the data sets representative of customer questions are identified based on sentences ending in a question mark or including a question phrase or a helping verb, and
   wherein, for each of the customer intent data sets, the computing device mines a set of corresponding answers from the one or more raw customer conversation data sources and determines a composition of each customer intent data set based at least in part on the set of corresponding answers.

2. The method of claim 1 wherein the customer message data is customer question data.

3. The method of claim 1 wherein each customer intent data set corresponds to multiple customer expression data sets.

4. The method of claim 1 wherein the one or more data sources include at least one of customer chat records, phone call transcripts, or search queries.

5. The method of claim 1 wherein the structured database includes business-related tags corresponding to the customer intent data sets.

6. The method of claim 1 wherein pre-processing includes filtering for at least one of (i) specific textual words or phrases or (ii) an amount of text above or below a length threshold.

7. The method of claim 1 wherein pre-processing includes spell checking and error correcting before clustering.

8. The method of claim 7 wherein spell checking and error correcting include using at least one of an acronym expansion tool, a suggested spelling tool, an equivalent word replacement tool, or a stop phrase removal tool.

9. The method of claim 7 wherein spell checking and error correcting include identifying one or more misspelled words and correcting the one or more misspelled words using a spell corrector module trained based on an analysis of historical message logs.

10. The method of claim 1 wherein pre-processing includes tokenizing the data sets representative of the set of customer questions into individual sentences and selecting any individual sentences that are questions.

11. The method of claim 1 wherein pre-processing includes applying a noise filter to the data sets representative of the set of customer questions.

12. The method of claim 1 further including partitioning the customer intent data sets by at least one product type, business unit, or company-specific need.

13. The method of claim 1 further including determining an answer to each customer intent data set based on a pattern determined by analyzing the one or more data sources.

14. The method of claim 13 further including modifying a style or tone of at least one of the answers to enhance presentation of the answer for a customer.

15. The method of claim 13 wherein determining an answer includes rank ordering two or more possible answers and selecting a best answer among the possible answers.

16. The method of claim 13 further including presenting the answer to a customer in a virtual assistant module.

17. The method of claim 13 further including presenting the answer in a frequently asked questions module.

18. The method of claim 13 further including presenting one or more answers in real time in response to a search query on webpage.

19. The method of claim 13 further including presenting one or more answers in a customer representative training exercise.

20. A computing system for populating one or more structured databases having a set of customer intent data sets, a set of expression data sets corresponding to the set of customer intent data sets, and a set of answer data sets corresponding to a set of customer intent data sets, the computing system comprising:
- a database including one or more data sources having customer message data;
- a computing device in electronic communication with the database, the computing device configured to automatically discover customer intent data sets, expression data sets for the customer intent data sets, and answer data sets corresponding to the customer intent data sets; and
- a server in electronic communication with the computing device, the server configured to interface with one or more customer devices, wherein the computing device is further configured to:
(i) receive customer message data from one or more raw customer conversation data sources;
(ii) extract, from the customer message data, data sets representative of a set of customer questions;
(iii) pre-process the data sets representative of customer questions using one or more filters, thereby producing pre-processed data sets representative of customer questions;
(iv) extract, from the pre-processed data sets representative of customer questions, a set of customer expression data sets;
(v) group, via unsupervised semantic clustering, the customer expression data sets into a set of clusters, each cluster representing one customer intent data set, each customer intent data set corresponding to one or more customer expression data sets; and
(vi) store the customer intent data sets and the customer expression data sets in the one or more structured databases, the one or more structured databases in electronic communication with the computing device, wherein the data sets representative of customer questions are identified based on sentences ending in a question mark or including a question phrase or a helping verb, and wherein, for each of the customer intent data sets, the computing device mines a set of corresponding answers from the one or more raw customer conversation data sources and determines a composition of each customer intent data set based at least in part on the set of corresponding answers.

* * * * *